United States Patent [19]
Jones, Jr.

[11] 3,774,753
[45] Nov. 27, 1973

[54] BUNDLE FEED DEVICE

[76] Inventor: Otis V. Jones, Jr., 18530 Weaver, Apt. 202A, Detroit, Mich. 48228

[22] Filed: Mar. 27, 1972

[21] Appl. No.: 238,094

[52] U.S. Cl. .................................. 198/219, 198/24
[51] Int. Cl. ............................................. B65g 25/04
[58] Field of Search ......................... 198/21, 24, 219

[56] References Cited
UNITED STATES PATENTS

| 3,292,799 | 12/1966 | Eggleston et al. | 198/219 |
| 3,289,820 | 12/1966 | Jones, Jr. | 198/219 |
| 3,547,249 | 12/1970 | Aguilar et al. | 198/219 |
| 3,554,351 | 1/1971 | Rothenbach | 198/21 |

Primary Examiner—Richard E. Aegerter
Assistant Examiner—Joseph E. Valenza
Attorney—Robert C. Hauke et al.

[57] ABSTRACT

A device for feeding elongated bars or the like singly and in proper orientation from a plurality or a bundle of such bars to a stock feeding apparatus employed as a means for loading bar stock into conventional multiple or single spindle metal working machines. The loading device includes longitudinally spaced inclined walking beams operable to move the bars up a ramp and means for sensing misalignment of the bars and for stopping one of the walking beams until the other walking beam has moved the bar into an aligned position.

7 Claims, 8 Drawing Figures

BUNDLE FEED DEVICE

BACKGROUND OF THE INVENTION

1. Field of the Invention

This invention relates to feed devices and more particularly to such a device for delivering elongated bars to a loader connected to single or multiple spindle working machines.

2. Description of the Prior Art

In my previous patents, U. S. Pat. No. 3,147,653 issued Sept. 8, 1964 and U. S. Pat. No. 3,010,605 issued Nov. 28, 1961, a loading system especially suitable for multiple spindle machines is disclosed wherein bar stock is sequentially fed into a stock reel from which the bar stock is moved longitudinally into the collet of a single or multiple spindle machine. The magazine at the top of the reel must be provided with a single bar of stock at a time in a properly oriented position. No means other than manual is disclosed in these patents for loading the stock reel.

The difficulty encountered in providing an automatic feed device for stock loading apparatus of this kind resides in the fact that bar stock is ordinarily shipped and transported in bundles wherein the individual bars may be skewed relative to one another. As a result, the feed device must be capable of removing the bars from a disarrayed bundle and then delivering the bars one at a time to a stock reel in a properly oriented position.

My previous U. S. Pat. No. 3,289,820 issued Dec. 6, 1966 discloses a feed device intended for use with stock reels like those disclosed in my aforementioned patents. While this device is generally satisfactory and is a substantial improvement over manual loading of stock reels, the means provided to insure that the bars of stock will be delivered to the stock reel in parallel, aligned position has not been entirely satisfactory. With the device disclosed in this patent it is still possible that a bar will be delivered to the stock reel in an improperly oriented position. Even though this does not happen very often, the disruption to the operation of the machine and the danger of damage and injury resulting from such misalignment makes it important that it not occur at all. The present invention provides a solution to this problem.

SUMMARY OF THE PRESENT INVENTION

The present invention comprises a pair of spaced walking beams each inclined upwardly from a bundle receiving support member. The walking beams are notched to receive one of the bars of stock at a time and to walk it to the top of the ramp formed by the walking beams where it is deposited into the stock reel. The walking beams are provided with individual clutching mechanisms and means are provided in the form of limit switches to operate the clutching mechanism to disengage a walking beam in the event of a bar engaging the limit switch before the limit switch on the other walking beam is engaged by the bar. In this way the walking beam which continues to operate does so until it catches up with the disengaged walking beam to present the bar at the top of the ramp in a properly oriented parallel position.

DESCRIPTION OF THE DRAWINGS

A better understanding of the present invention will be achieved upon reference to the following drawings in which like reference characters refer to like parts throughout the several views, and in which.

DESCRIPTION OF THE PREFERRED EMBODIMENT

Figure 2:
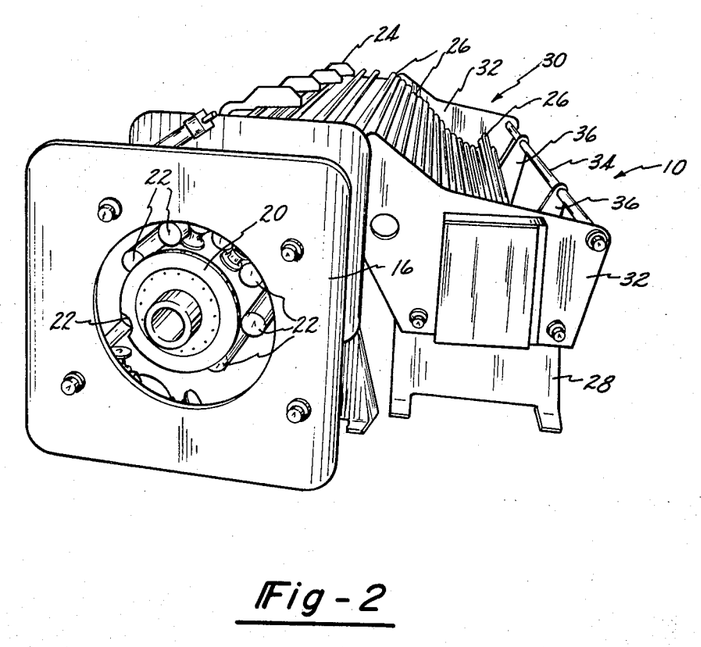
FIG. 2 is an elevational view of a feed device of the present invention and illustrating its use with a loading device.
Figure 4:
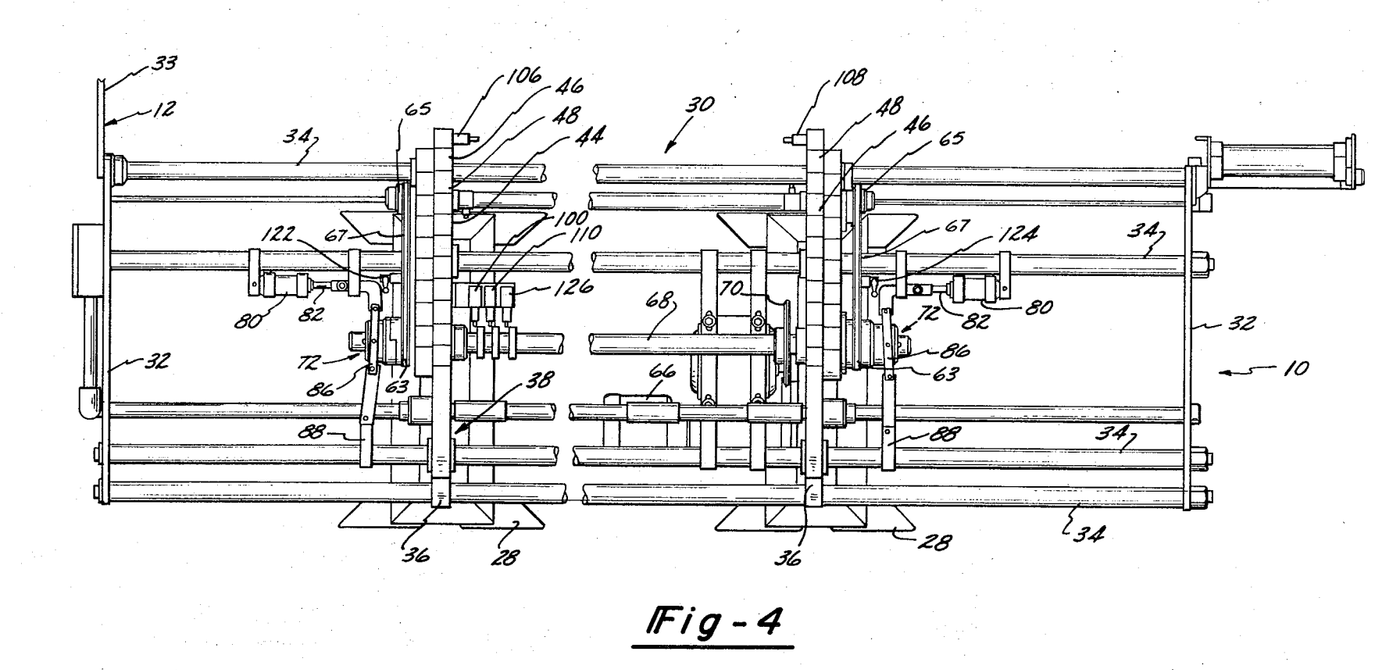
FIG. 4 is a top plan view of the device shown in FIG. 1.

Now referring to the drawings for a more detailed description of the present invention, FIGS. 2 and 4 illustrate the present bundle feed device 10 positioned adjacent a stock loading apparatus 12 which is adapted to feed bar stock into conventional multiple or single spindle machines (not shown). While it has been preferred to illustrate the feed device 10 as being used with a stock loading apparatus 12, it should be apparent that it can in some applications be used without such apparatus. The stock loading apparatus 12 may be of the type disclosed in my U. S. Pat. No. 3,010,605 issued Nov. 28, 1961 and U. S. Pat. No. 3,147,653 issued Sept. 8, 1964 and as best shown in FIG. 2 preferably includes a housing 16 carrying a rotatable reel 20 carrying a plurality of tubes 22 and having an upper loading section 24 upon which the bars 26 of stock are placed preparatory to being fed one at a time into the tubes 22. The tubes 22 are adapted to move the bars 26 axially into collets (not shown) of an adjacent multiple spindle metal working machine (not shown).

Figure 1:
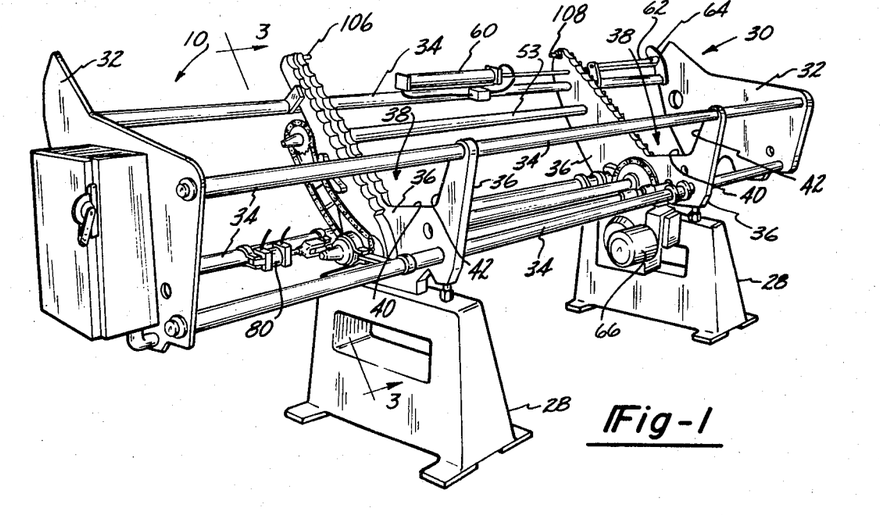
FIG. 1 is a front perspective view of a bundle feed device of the present invention.

As can best be seen in FIG. 1, the bundle feed device 10 generally comprises a pair of spaced support bases 28 and a feed apparatus 30 mounted to the top of the support bases 28. The feed apparatus 30 comprises a pair of spaced end plates 32 joined together by a plurality of tie rods 34.

Intermediate section members 36 are mounted to extend vertically upwardly from the support bases 28 and are formed to provide a bundle receiving portion 38 defined by a substantially horizontal edge 40 and a substantially vertical edge 42. A portion 44 of the section members 36 extends angularly upwardly from the horizontal edge 40 to define a ramp.

Figures 3, 8:
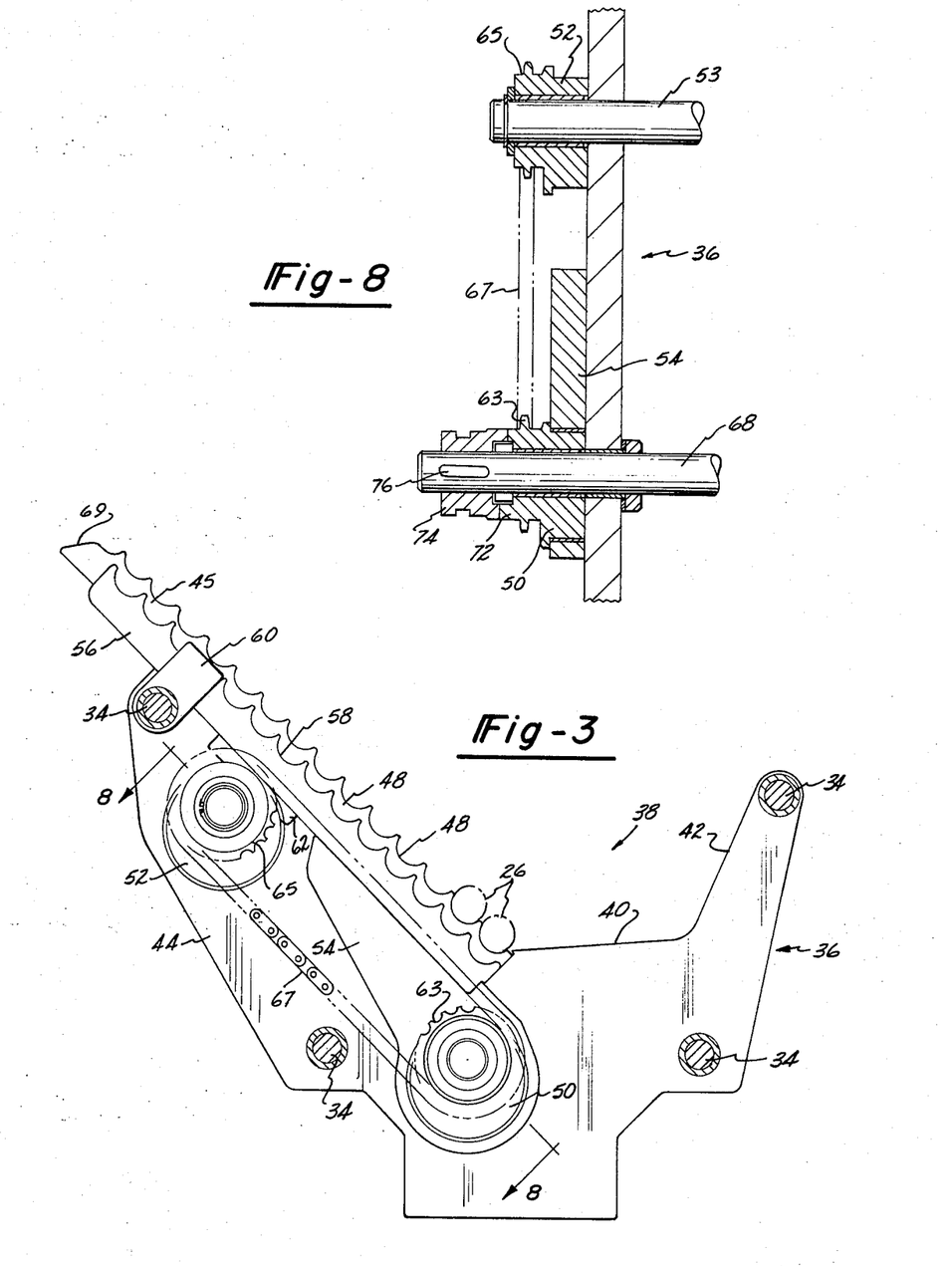
FIG. 3 is a cross-sectional view taken substantially on line 3—3 of FIG. 1 enlarged somewhat and with parts removed for purposes of clarity.
FIG. 8 is a cross-sectional view taken substantially on line 8—8 of FIG. 3.

As can best be seen in FIGS. 1, 3 and 4, the inclined inner edge 46 of the portion 44 carries a rack member 45 provided with spaced grooves 48 to receive the bars 26 of stock. The rods 34 extend through the sections 36 to provide support therefor.

As can best be seen in FIGS. 3 and 8, a shaft 68 is journalled in the section member 36. A first cam 50 is eccentrically journalled on the shaft 68. A second cam 52 is eccentrically journalled to a fixed rod 53 extending between the portions 44. The first cam 50 carries a rack arm 54 which extends upwardly along the edge 46 of the portion 44. A rack 56 is mounted to the arm 54 adjacent the rack member 45 and is provided with grooves 58 which are spaced to correspond with the grooves 48 formed in the inclined edge 46 of the portion 44. A guide member 60 is mounted to one of the rods 34 and extends upwardly to provide sliding support for the free end of the rack 56.

The second cam 52 is spaced upwardly from the first cam 50 and is disposed beneath the lower edge of the rack 56. A cam shoe 62 is disposed intermediate the second cam 52 and the bottom edge of the rack 56 and transmits eccentric rotation of the second cam 52 to sliding movement of the rack 56.

The first cam 50 is rotated by a shaft 68 in a manner which will be subsequently described and carries a sprocket 63 to rotate a sprocket 65 formed on the second cam 52. A chain 67 connects the sprockets 63, 65.

It is to be understood that although the description of the assembly has been described only with respect to the section members 36 at the left end of the device as shown in FIG. 1, the construction is the same at the right end of the feed device.

It is apparent that the racks 56, the cams 50 and 52 and the grooved portions 44 form a pair of spaced, inclined, walking beams in which the racks 56 are moved upwardly by the action of the first cam 50 and the second cam 52 to receive a bar 26 of stock in the grooves 58. The bar 56 of stock is then moved in a direction substantially parallel to the upper edge of the portion 44 by the action of the cams 50, 52 which eccentrically rotate the rack arm 54 and rack 56 between the down position shown in FIG. 3 and an upper position in which the grooves 58 are spaced above and up the ramp from their original positions. The rack 56 then moves back downwardly in an eccentric circular movement to deposit the bar on the next higher groove 48 of the portion 44 and returns to its starting position to move the bar 26 higher up the ramp on the next cycle of operation. In this way the bundle of bars will be separated and moved up the ramp to the receiving area 24 of the stock reel 12. As best seen in FIG. 3, the end 69 of the rack 56 is elongated and inclined downwardly to urge the bars 26 to roll off the end of the ramp when they have reached the top.

The inclination of the ramp and the diameters of the notches 48 and 58 are such that doubling up of bars 26 on the ramp is impossible. If pyramiding begins to develop, the upper bars 26 will fall back down the ramp to the bundle receiving portion 38 before they travel very far up the ramp. The racks 45 and 56 are therefore replaceable to permit the loading device to be used with different bars of different diameters.

As can best be seen in FIG. 1, a fluid actuated linear actuator 60 is mounted to the rod 34 adjacent the upper ends of the portions 44. The actuator 60 has an extendable rod 62 which extends through one of the section members 36 and which carries a cap 64 on its free end. The cap 64 is disposed to be spaced from the ends of the bars 26 in the extended position of the linear actuator 60. Each time a bar 26 is moved to the uppermost groove the linear actuator 60 is actuated to retract the rod 62 so that the cap 64 engages the end of the bar 26 to move it axially into engagement with a stop plate 33 for the stock reel 12 (FIG. 4). The bar 26 is then in position to be received by the stock reel 12.

A motor 66 is mounted to one of the support bases 28 and is drivingly connected to the shaft 68 through a sprocket 70 and chain 71 or the like. The shaft 68 is rotatably journalled in the section members 36. Axially shiftable clutch assemblies 72 are mounted to the ends of the shaft 68 and when in the position shown in FIG. 8 and in solid lines in FIG. 5 provide a driving connection between the shaft 68 and the first cams 50.

The clutch assemblies 72 are of conventional construction and, as can best be seen in FIG. 8, include first member 74 which is drivingly connected to the end of the shaft 68. The member 74 is connected to the sprocket member 72 and to the first cam 50 by a key 76 such that axial movement of the member 74 disengages the driving engagement between the first cam 50 and the shaft 68. The second cam 52 rotates freely on the rod 53 so that it is rotated by the sprocket 65 and chain 67 with the first cam 50 and is disengaged anytime that the first cam 50 is disengaged. Since a separate clutch assembly 72 is provided for each section member 36 it is apparent that operation of the walking beams can be individually controlled by controlling the clutch assemblies 72.

Figure 5:
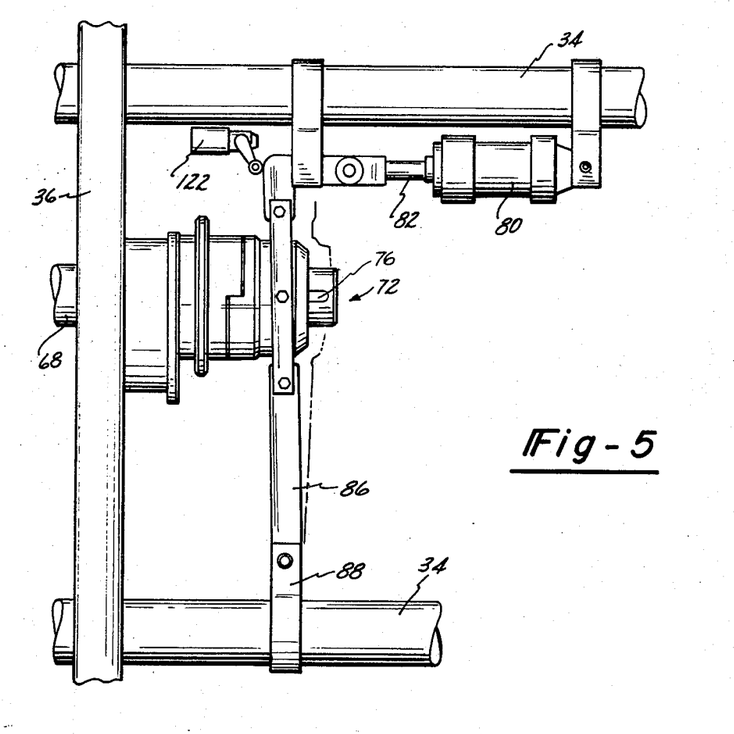
FIG. 5 is a fragmentary view of the structure shown in FIG. 4 enlarged somewhat for clarity.

As shown in FIG. 5, the clutch assembly 72 is shifted axially by means of a fluid actuated linear actuator 80 mounted to one of the rods 34 and having an extendable rod 82 secured to the free end of an actuating lever 86. The lever 86 is pivotally mounted to a bracket 88 carried by another of the rods 34 and is fastened to the clutch assembly 72 to move it axially upon pivotal movement of the lever 86. The lever 86 is pivotal is response to retraction and extension of the rod 82 of the actuator 80.

Figure 6:
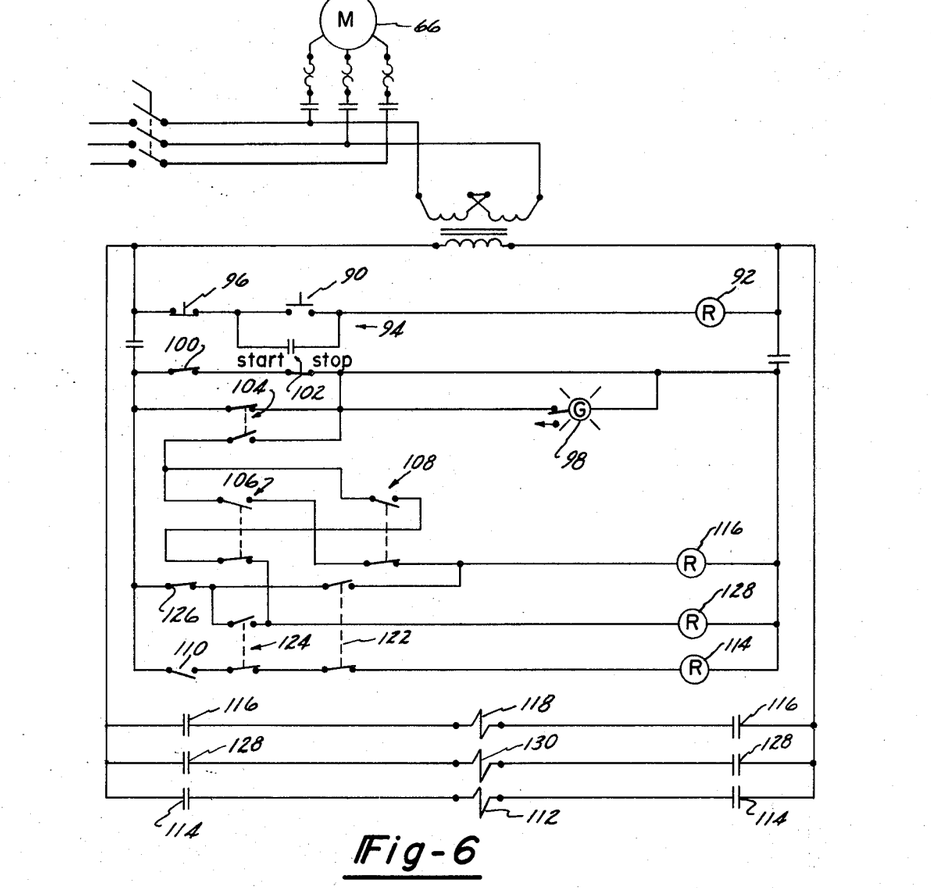
FIG. 6 is a schematic representation of the electrical system for the present invention.
Figure 7:
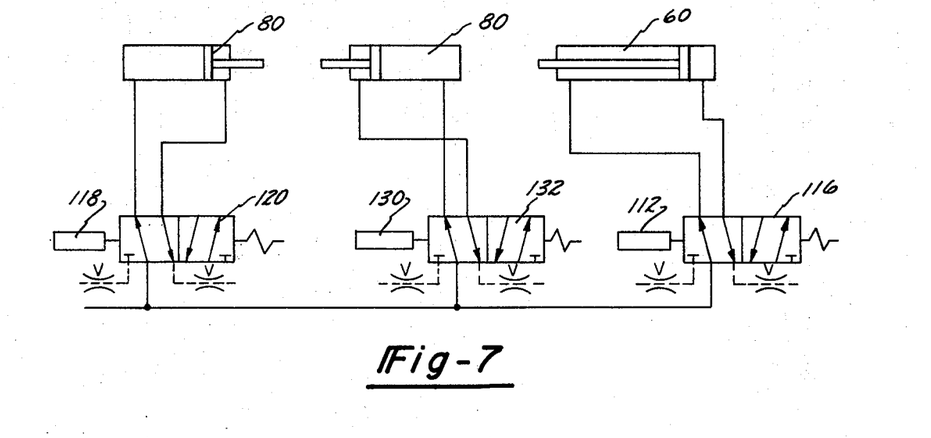
FIG. 7 is a schematic representation of the fluid system for the present invention.
Figure 8:
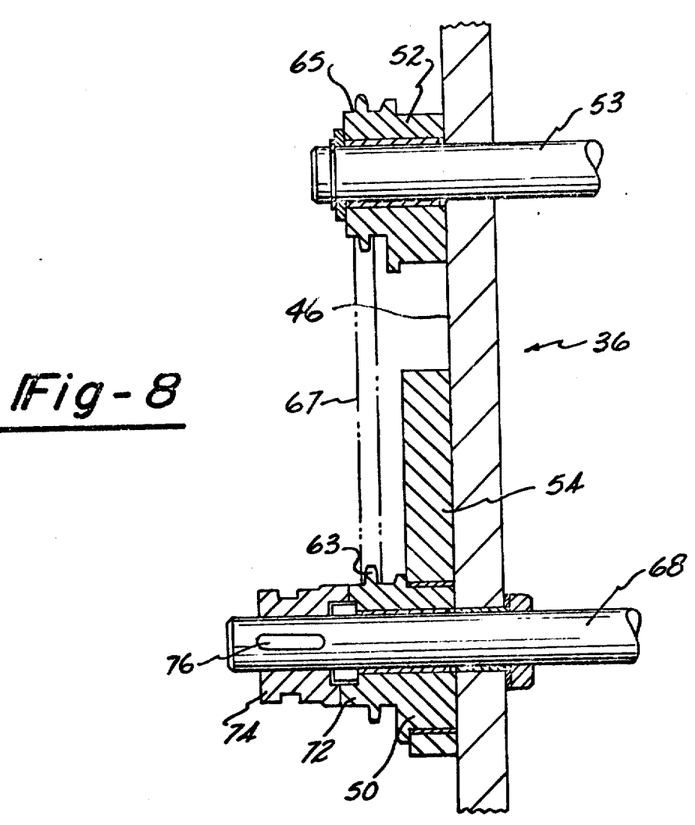

FIGS. 6 and 7 illustrate the electrical and pneumatic circuits respectively for the feed device 10 of the present invention. Referring first to FIG. 6, the motor 66 is energized by pushing switch 90. This energizes a motor relay 94 as well as a latching relay 92. A stop switch 96 is provided to deenergize the motor 66. Actuating switch 90 also energizes light 98. Limit switch 104 is disposed in a position to open when the rack 56 is disposed in the down position so that to load a bundle of bars in the feed device 10 a cycle switch 102 is turned to the stop position and the motor 66 will be stopped when the limit switch 104 senses that the racks 56 are in the down position. Limit switch 100 is disposed adjacent the receiving portion of the stock reel 12 and opens the circuit to the motor 66 in the event that the stock reel 12 is not ready to receive new stock or closes the circuit to the motor 66 when the stock reel 12 can receive new stock.

After the bundle of bars have been placed in the receiving portion 38 of the feed device 10 and the straps holding the bundle together have been removed, the switch 102 is moved to the "start" position and separation and transfer of the bars to the stock reel will begin.

Limit switches 106 and 108 are mounted to the upstanding portions 44 of the section members 36, as can best be seen in FIG. 1, in a position to be engaged by a bar 26 advancing to the highest groove of the walking beam. If the bar is properly oriented as it proceeds to the top of the rack, it will close both switches 106 and 108.

Limit switch 104 is disposed to sense the completion of a cycle of the walking beam and is momentarily opened then each time a bar of stock is disposed on the uppermost set of grooves. Closing the switch 110 energizes a solenoid 112 through a relay 114. The solenoid 112 actuates a valve 116 (FIG. 7) which controls the linear actuator 60 to position the bar axially against the stop plate 33 of the stock reel 12 as heretofore explained.

In the event that one end of the bar 26 reaches the top of the rack before the other does so that the bar is not properly oriented to be received by the stock reel 12, one of the limit switches 106 or 108 will remain open. Assuming limit switch 108 remains open, then with limit switch 106 closed relay 116 is actuated to energize solenoid 118. Solenoid 118 controls a valve 120 (FIG. 7) which causes the linear actuator 80 to disengage the clutch mechanism for the rack containing the limit switch 106 until the other end of the bar 26 catches up and closes limit switch 108. Limit switches 122 and 124 are positioned to be engaged by the clutch assembly 72 and act to hold the circuit closed until a limit switch 126 is opened upon completion of each cycle of the racks to release the clutches 72 before each cycle begins.

If limit switch 106 remains open, then the actuator 80 on the side with limit switch 106 is actuated through a relay 128, a solenoid 130 and a valve 132 in the manner described above.

It is apparent that a stock feed device has been disclosed in which the bar stock will be delivered singly and in the proper orientation in each instance thus eliminating breakdowns and damage which occur when such stock is not properly delivered.

It is also apparent that although I have described but a single embodiment of the present invention many changes and modifications can be made without departing from the spirit of the invention.

I claim:

1. A feed and orientation device for a plurality of elongated members, comprising:
 a frame;
 at least a pair of inclined feed sections in said frame, the elongated members being normally stored in lateral abutment with said feed sections at a location below the upper ends thereof;
 each of said feed sections including a fixed member having an upper inclined edge, said edge having spaced grooves adapted to receive the elongated members, a feed rack having grooves corresponding to those of said fixed member and mounted to said frame to be movable eccentrically with respect to said fixed member to move the elongated member from said stored position to progressively higher grooves in said feed sections;
 means for individually powering said feed racks; and
 means disposed at the upper ends of said feed sections, said means sensing the presence of one of the elongated members in a groove of one of said fixed members at a position higher than the position of the elongated member in the groove of the other of said fixed members and operable to deactivate the power to the rack associated with said first mentioned fixed member until the ends of the elongated member are aligned.

2. The device as defined in claim 1 and in which said powering means comprises a motor and first and second clutch means respectively connected intermediate said motor and said feed racks.

3. The device as defined in claim 2 and in which said sensing means comprises limit switches positioned to be actuated by the ends of the elongated members as said elongated members are moved up said fixed members, means connected with said limit switches and operable upon one of said limit switches being engaged prior to the other being engaged to actuate the clutch means to disconnect the motor means from the feed rack containing the higher end of the elongated member, said means being operable to actuate said clutch means to drivingly connect said motor means and said feed rack upon said other limit switch being engaged by the opposite end of the elongated member.

4. The feed device as defined in claim 1 and in which said powering means includes a motor, a shaft drivable by said motor, means at each end of said shaft for drivingly connecting said shaft to said feed racks to produce movement of said feed racks in a first direction perpendicular to the inclined edge of said fixed member and in a second direction parallel to the edge of said fixed member, said clutch means being connected intermediate said driving means and said shaft.

5. The feed device as defined in claim 1 and in which said powering means comprises a motor, a shaft driven by said motor, a first cam driven by said shaft and a second cam driven by said shaft, an arm connecting said first cam to said feed rack to produce movement of said feed rack in a reciprocating movement parallel to the inclined edge of said fixed member upon rotation of said first cam, said second cam being disposed beneath said feed rack to impart movement to said feed rack perpendicular to the edge of said fixed member upon rotation of said second cam.

6. A feed and orientation device for a plurality of elongated members, comprising:
 a frame,
 at least a pair of inclined feed sections in said frame, the elongated members being normally stored in lateral abutment with said feed sections at a location below the uppermost ends thereof;
 each of said feed sections including a fixed member having an upper inclined edge, said edge having spaced grooves adapted to receive the elongated members, a feed rack having grooves corresponding to those of said fixed member and mounted to said frame to be movable eccentrically with respect to said fixed member to move the elongated members from said stored position to progressively higher grooves in said feed sections;
 means for individually powering said feed racks; said powering means including a motor, a shaft drivable by said motor, means at each end of said shaft for drivingly connecting said shaft to said feed racks to produce movement of said feed racks in a first direction perpendicular to the inclined edge of said fixed member and in a second direction parallel to the edge of said fixed member, said clutch means being connected intermediate said driving means and said shaft,
 said clutch means being movable axially between a position producing a driving connection between said shaft and said connecting means and including linear fluid actuators connected with each of said clutch means to produce axial movement thereof; and
 means sensing the presence of one of the elongated members in a groove of one of said fixed members at a position higher than the position of the elongated member in the groove of the other of said fixed members and operable to deactivate the power to the rack associated with said first mentioned fixed member until the ends of the elongated members are aligned.

7. A feed and orientation device for a plurality of elongated members, comprising:

a frame;

at least a pair of inclined feed sections in said frame, the elongated members being normally stored in lateral abutment with said feed sections at a location below the uppermost ends thereof;

each of said feed sections including a fixed member having an upper inclined edge, said edge having spaced grooves adapted to receive the elongated members, a feed rack having grooves corresponding to those of said fixed member and mounted to said frame to be movable eccentrically with respect to said fixed member to move the elongated members from said stored position to progressively higher grooves in said feed sections;

means for individually powering said feed racks; said powering means comprising a motor, a shaft driven by said motor, a first cam driven by said shaft and a second cam driven by said shaft, an arm connecting said first cam to said feed rack in a reciprocating movement parallel to the inclined edge of said fixed member upon rotation of said first cam, said second cam being disposed beneath said feed rack to impart movement to said feed rack perpendicular to the edge of said fixed member upon rotation of said second cam;

clutch means connecting said shaft and said first cam, said second cam being axially offset from said first cam, and means driving said second cam through said clutch means and said first cam, and means sensing the presence of one of the elongated members in a groove of one of said fixed members at a position higher than the position of said elongated members in the groove of the other of said fixed members and operable to deactivate the power to the rack associated with said first mentioned fixed member until the ends of the elongated members are aligned.

* * * * *

UNITED STATES PATENT OFFICE
CERTIFICATE OF CORRECTION

Patent No. 3,774,753  Dated November 27, 1973

Inventor(s) Otis V. Jones, Jr.

It is certified that error appears in the above-identified patent and that said Letters Patent are hereby corrected as shown below:

Col. 4, line 5, after "71", insert --(FIG. 1)--;

line 12, delete "FIG. 8" and insert --(FIGS. 8 and 5)--;
line 12, after "include", insert --a--;

line 14, after "68", insert --by a key 76--;

line 14, delete "The member 74 is connected to the"; delete line 15;
line 16, delete "76 such that"; same line, delete "axial" and insert --Axial--;

line 18, delete "shaft 68" and insert --member 74 in a conventional manner--.

line 33, after "pivotal", delete "is" and insert --in--.

In the Drawings:

In FIG. 1, insert the numeral --71-- and a lead line to the chain.

In FIG. 4, change reference numeral "65" to --33--.

In FIG. 5, insert the numeral --74-- and a lead line to the first member.

UNITED STATES PATENT OFFICE
CERTIFICATE OF CORRECTION

Patent No. 3,774,753         Dated November 27, 1973

Inventor(s) Otis V. Jones, Jr.

It is certified that error appears in the above-identified patent and that said Letters Patent are hereby corrected as shown below:

In FIG. 8, insert the numeral --46-- and a lead line as shown on the attached sheet.

Signed and sealed this 3rd day of September 1974.

(SEAL)
Attest:

McCOY M. GIBSON, JR.                C. MARSHALL DANN
Attesting Officer                   Commissioner of Patents

Fig-8